UNITED STATES PATENT OFFICE.

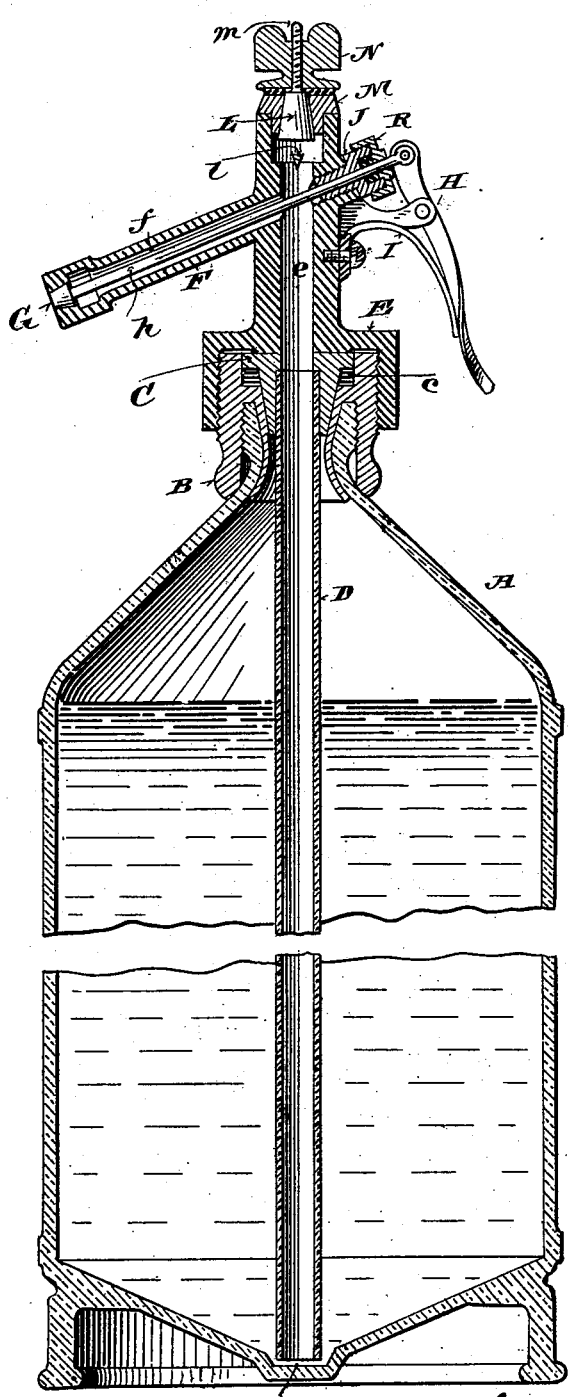

WOODBRIDGE H. BIRCHMORE, OF BROOKLYN, NEW YORK, ASSIGNOR OF ONE-HALF TO CLARKSON A. COLLINS, OF NEW YORK, N. Y.

VESSEL FOR CONTAINING AND DISTRIBUTING LIQUIDS.

SPECIFICATION forming part of Letters Patent No. 714,092, dated November 18, 1902.

Original application filed December 6, 1901, Serial No. 84,863. Divided and this application filed March 4, 1902. Serial No. 96,658. (No model.)

*To all whom it may concern:*

Be it known that I, WOODBRIDGE H. BIRCHMORE, a subject of the King of Great Britain, residing in the borough of Brooklyn, city of New York, county of Kings, and State of New York, have invented certain new and useful Improvements in Vessels for Containing and Distributing Liquids, of which the following is a specification.

This application is a division of an application for Letters Patent filed by me on December 6, 1901, Serial No. 84,863, for a method of and means for preserving liquids.

My herein-described invention relates generally to the class of vessels known as "siphon-bottles;" and the specific object of my improvements is to provide a vessel of this class suitable for use in connection with the process described and claimed in my application aforesaid or other similar process, though my invention may be usefully applied in any case where it is desired to employ a siphon-bottle.

Heretofore an attempt has been made to use an ordinary siphon-bottle in the preservation and distribution of milk. Its use for this purpose has, however, proven impracticable, since in such bottles the valve which controls the outlet-passage is located near the base of the top of the bottle at a point considerably removed from the point of discharge from the vessel, so that a vacant or dead space intervenes between such point of discharge and the valve and forms a veritable trap for filth from the atmosphere, in which disease-germs collect and readily propagate and whence they are unavoidably washed out and enter the milk as often as it is drawn from the siphon. In order to obviate this difficulty and prevent any possible contamination of the milk or other liquid on its way from the interior of the distributing vessel to the cup or other vessel from which it is directly consumed, I provide an air-tight containing and distributing vessel in which the valve or valves which control the passages which communicate with the interior thereof are so located that there is no space connected with the vessel and exterior to the valve, in which germs can collect or liquid remain exposed to the atmosphere and which is so arranged that all its parts can be readily and thoroughly cleansed and sterilized when it is emptied.

My invention will be best understood by reference to the accompanying drawing, which shows in section a siphon-bottle in which it is embodied.

Referring to the drawing, A indicates the body of the vessel or bottle, to which a metal top or head E is removably secured in any usual or suitable manner, as by being screwed to a threaded collar B c the neck of the bottle. Through the top or head E runs a vertical passage *e*, which is continued to a point near the bottom of the vessel by a tube D. With the passage *e* is connected a downwardly-inclined discharge-tube F, which for convenience in manipulating its valve is made straight throughout its entire length. The bore *f* of the tube F is closed by a valve G, located at the outer end of the tube. Preferably the outer face of the valve is made substantially flush with the orifice of the tube. The valve G is arranged to be opened inwardly in any usual or suitable manner, as by the handle H and stem *h*, which passes through a bushing in the opposite wall of the passage *e* and is held positively closed, as by the spring I. While the vessel may be filled through the discharge-tube F, I prefer for this purpose to continue the vertical passage *e* through the upper end of the top or head E, where it is closed by a valve L, the outer surface of which when closed is substantially flush with the orifice of the passage *e*. The valve L is arranged to be closed upward by pressure from within the vessel and when such pressure is removed to fall or by pressure from without to be forced down upon stops *l*. The valve L is preferably provided with a threaded stem *m*, upon which is screwed a cap N to hold the valve positively in place and securely cover the orifice when the bottle is filled.

In filling the bottle the liquid to be contained therein and the gas whereby the liquid is expelled from the bottle are forced in by the valve L in any usual or convenient manner. When the bottle has been filled with liquid and gas under pressure, upon releasing the pressure from without the valve is closed upward by the pressure from within the bottle and may then be further secured by the cap N.

In drawing liquid from the bottle the valve G is opened by means of the handle H and stem $h$, and the liquid is forced out by the gas-pressure within the bottle, as in the ordinary siphon.

It will be evident that by means of my invention I do away with all dead space in which disease-germs can collect and wherein a residue of liquid can remain exposed to the atmosphere and enable a liquid to be drawn for consumption in successive portions without possibility of contamination and in the same state in which it is within the vessel.

The advantages of this will be readily apparent to those skilled in the art.

What I claim as new, and desire to secure by Letters Patent, is—

1. A vessel for preserving and distributing liquids under air or gas pressure, comprising a hollow body, a siphon-tube extending into said hollow body, and having a discharge portion extending outside of said hollow body, a liquid-tight inwardly-opening controlling-valve located in said discharge portion of the siphon-tube at the extreme outer end thereof, and forming the only controlling-valve for said tube, whereby access of the atmosphere to any part of the siphon-tube is prevented until after the contents of the vessel are completely discharged, substantially as described.

2. A vessel for preserving and distributing liquids under air or gas pressure, comprising a hollow body, a siphon-tube extending into said hollow body, and having a discharge portion extending outside of said body, an inwardly-opening liquid-tight valve, located at the extreme outer end of the discharge portion of said tube, and having its outer end flush with the discharge end of said tube, said valve forming the only controlling-valve for the siphon-tube, whereby the access of the atmosphere to any part of the siphon-tube is prevented until after the contents of the vessel are entirely discharged, substantially as described.

3. A vessel for preserving and distributing liquids under air or gas pressure comprising a hollow body, a main tube extending into the same, an inwardly-opening valve at the upper end of said tube, having a stem extending outside of the tube, a movable securing device engaging said stem for positively holding said valve in its closed position, a discharge-tube connected with said main tube at a point between its ends, and a valve located at the extreme outer end of said discharge-tube, substantially as described.

4. A vessel for preserving and distributing liquids, comprising a hollow body, a tube extending downwardly within said body to a point near the bottom thereof, an inlet-valve at the top of said tube, having its outer surface flush with the orifice thereof, an outlet-passage connected with said tube and a valve for said passage, having its outer surface flush with the orifice thereof, substantially as and for the purposes set forth.

In testimony whereof I have hereunto subscribed my name this 3d day of March, A. D. 1902.

WOODBRIDGE H. BIRCHMORE.

Witnesses:
CLARKSON A. COLLINS,
JAMES A. LYNCH.